United States Patent
Shin et al.

(10) Patent No.: US 11,046,359 B2
(45) Date of Patent: Jun. 29, 2021

(54) STEER-BY-WIRE SYSTEM AND CONTROL METHOD THEREOF

(71) Applicant: MANDO CORPORATION, Pyeongtaek-si (KR)

(72) Inventors: Donghoon Shin, Seoul (KR); SangJin Ko, Daejeon (KR)

(73) Assignee: MANDO CORPORATION, Pyeongtaek-si (KR)

( * ) Notice: Subject to any disclaimer, the term of this patent is extended or adjusted under 35 U.S.C. 154(b) by 256 days.

(21) Appl. No.: 16/117,323

(22) Filed: Aug. 30, 2018

(65) Prior Publication Data
US 2019/0092377 A1 Mar. 28, 2019

(30) Foreign Application Priority Data

Sep. 25, 2017 (KR) .................. 10-2017-0123566
Sep. 25, 2017 (KR) .................. 10-2017-0123575
Sep. 29, 2017 (KR) .................. 10-2017-0126937

(51) Int. Cl.
*B62D 5/04* (2006.01)
*B62D 5/00* (2006.01)
*H02P 25/08* (2016.01)

(52) U.S. Cl.
CPC ............ *B62D 5/046* (2013.01); *B62D 5/006* (2013.01); *B62D 5/0481* (2013.01); *H02P 25/08* (2013.01)

(58) Field of Classification Search
CPC . B62D 5/00; B62D 5/04; B62D 5/046; B62D 5/0481; B62D 5/006; H02P 25/08; H02P 6/10; H02P 6/16; H02P 23/14
See application file for complete search history.

(56) References Cited

U.S. PATENT DOCUMENTS 6,219,604 B1 * 4/2001 Dilger ............... B62D 6/003
                                                              180/422
2004/0262063 A1 * 12/2004 Kaufmann ........... B62D 1/286
                                                              180/169
(Continued)

FOREIGN PATENT DOCUMENTS

JP      2005-088610 A     4/2005
JP      2006-182058 A     7/2006
(Continued)

OTHER PUBLICATIONS

Korean Office Action dated Nov. 15, 2018 issued in Korean Patent Application No. 10-2017-0123575.
(Continued)

*Primary Examiner* — Navid Ziaeianmehdizadeh
(74) *Attorney, Agent, or Firm* — Morgan, Lewis & Bockius LLP

(57) ABSTRACT

The present disclosure relates to a Steer-By-Wire system including: a torque sensor configured to sense torsion bar torque generated when the driver operates the steering wheel; a steering angle sensor configured to sense a steering angle of the steering wheel; a reaction motor configured to provide reaction force in a direction opposite an operating direction of the steering wheel; a state variable estimator configured to receive information on the torsion bar torque and the steering angle and configured to estimate a plurality of state variables from which disturbances have been removed; and a reaction controller configured to determine a reaction torque to be output from the reaction motor using the plurality of state variables estimated by the state variable estimator, and further relates to a control method thereof. Accordingly, it is possible to accurately recognize the driver's steering intention.

15 Claims, 12 Drawing Sheets

(56) References Cited

U.S. PATENT DOCUMENTS

| 2016/0126883 A1* | 5/2016 | Yoo | H02P 29/0241 |
| | | | 318/400.22 |
| 2018/0015945 A1* | 1/2018 | Kim | B62D 6/002 |
| 2019/0031231 A1* | 1/2019 | George | B62D 6/02 |

FOREIGN PATENT DOCUMENTS

| JP | 2012-131246 A | 7/2012 |
| KR | 10-2014-0078498 A | 6/2014 |
| KR | 10-2017-0095493 A | 8/2017 |

OTHER PUBLICATIONS

Korean Office Action dated Nov. 14, 2018 issued in Korean Patent Application No. 10-2017-0123566.
Korean Office Action dated Nov. 16, 2018 issued in Korean Patent Application No. 10-2017-0126937.
Notice of Allowance issued in corresponding Korean Application No. 10-2017-0126937, dated Apr. 25, 2019.

\* cited by examiner

STEER-BY-WIRE SYSTEM AND CONTROL METHOD THEREOF

CROSS REFERENCE TO RELATED APPLICATION

This application claims priority from Korean Patent Application Nos. 10-2017-0123575, 10-2017-0123566 & 10-2017-0126937, filed on Sep. 25, 2017, Sep. 25, 2017 & Sep. 29, 2017 which are hereby incorporated by reference for all purposes as if fully set forth herein.

BACKGROUND OF THE INVENTION

1. Field of the Invention

The present disclosure relates to a Steer-By-Wire system and a control method thereof and, more particularly, to a Steer-By-Wire system and a control method thereof, which can accurately determine a driver's steering intention and can reduce manufacturing costs by estimating a plurality of state variables for determining the drive's steering intention without employing additional sensors.

2. Description of the Prior Art

A Steer-By-Wire (SBW) system detects a driver's manipulation of a steering wheel, instead of a mechanical structure connecting the steering wheel and wheels, to thus generate signals, and controls the steering of the wheels using the signals.

An input unit including a steering wheel of the Steer-By-Wire system may include a steering angle sensor for detecting the steering angle of the steering wheel, a torque sensor for sensing the torque of a steering wheel shaft, a reaction motor for providing reaction torque according to the rotation of the steering wheel, and the like. An output unit thereof may include a steering output sensor for detecting the rotational angle of the wheel, a steering motor for generating assist force to facilitate the steering of the wheel, a steering motor position sensor for sensing the position of a rotational shaft of the steering motor, and the like.

When the driver turns the steering wheel, the amount of rotation of the steering wheel and torque of a torsion bar, which are sensed by the steering angle sensor and the torque sensor, are transmitted to an Electronic Control Unit (ECU), and the ECU generates current for steering control of the wheels and provides the same to the steering motor, thereby steering the wheels.

In addition, the Steer-By-Wire system generates force in a direction opposite the direction of the steering wheel when the driver operates the steering wheel using a reaction motor, thereby giving the driver an appropriate steering feeling.

However, in the Steer-By-Wire system, it is difficult to accurately determine the driver's steering intention using only the steering angle and torque. In order to compensate for this, a method of estimating and controlling driver torque by measuring the phase current of the reaction motor or the steering motor using a current sensor has been proposed. However, in the case in which such a current sensor is used, an electronic control unit for calculating the driver torque using factors measured by the current sensor and applying the same to the system must be further provided in addition to the current sensor, which results in disadvantages such as an increase in the number of components and manufacturing costs.

Accordingly, it is necessary to reduce manufacturing costs by making it possible to accurately determine the driver's steering intention without using the current sensor or the additional electronic control unit.

Meanwhile, even when the current sensor is provided, if an error occurs in the current sensor, it is impossible to accurately identify the driver's steering intention. Therefore, it is necessary to determine whether or not there is an error in the current sensor by verifying a phase current value sensed by the current sensor and to enable accurate determination on the driver's steering intention even in the event of an error of the current sensor.

In addition, if an error occurs in the torque sensor even when the current sensor is used, information on the torsion bar torque may not be provided, or erroneous information may be provided, which may cause malfunction of the system. Accordingly, it is necessary to provide a method for accurately determining the driver's steering intention even when an error occurs in the torque sensor or even when the torque sensor is not provided.

Since the Steer-By-Wire system has no mechanical connection between a steering rack gear and a steering column, it generates appropriate reaction force using a motor installed on the steering wheel when steering in order to provide a steering feeling similar to that of a conventional steering system. In this case, the magnitude of the reaction force to be generated is calculated based on the rack force, which is the external force applied to the rack gear, in the prior art, but this is an entirely different method from Electric Power Steering (EPS), and makes it impossible to utilize existing tuning capability/know-how.

SUMMARY OF THE INVENTION

An aspect of the present disclosure is to provide a Steer-By-Wire system that makes it possible to estimate a plurality of state variables for determining the driver's steering intention and torque ripples without using a current sensor, thereby allowing a reaction motor and a steering motor to output an accurate reaction torque and steering torque, and reduces the number of sensors and electronic control units, thereby lowering manufacturing costs, and further provides a control method thereof.

Another aspect of the present disclosure is to provide a Steer-By-Wire system that determines whether or not an error occurs in the current sensor and makes it possible to accurately determine the driver's steering intention even when an error occurs in the current sensor, and further provides a control method thereof.

Another aspect of the present disclosure is to provide a Steer-By-Wire system that makes it possible to estimate a plurality of state variables for determining the driver's steering intention, thereby accurately determining the driver's steering intention even when a torque sensor is faulty or even when the torque sensor is not employed, and further provides a control method thereof.

Further, another aspect of the present disclosure is provide a Steer-By-Wire system that calculates virtual manual torque, instead of the rack force, and generates steering reaction force based on the same, and further provides a control method thereof.

The above aspects of the present disclosure can be attained by a Steer-By-Wire system that may include: a sensor configured to sense state information on a vehicle, which is generated when a driver operates a steering wheel; a reaction motor configured to provide reaction force in a direction opposite an operating direction of the steering wheel; a state variable estimator configured to receive the state information on the vehicle and configured to estimate a plurality of state variables from which disturbances are removed; and a reaction controller configured to determine the reaction torque to be output from the reaction motor using the plurality of state variables estimated by the state variable estimator.

The above aspects of the present disclosure can also be attained by a control method of a Steer-By-Wire system, which may include: sensing state information on a vehicle, which is generated when a driver operates a steering wheel; receiving the state information on the vehicle and estimating a plurality of state variables from which disturbances are removed; and determining reaction torque to be output from a reaction motor configured to provide reaction force in a direction opposite an operating direction of the steering wheel using the plurality of state variables.

According to the present disclosure, since the driver's steering intention can be accurately recognized even when a separate sensor, such as a current sensor, is not provided, it is possible to accurately calculate the reaction torque provided to the reaction motor and the steering torque provided to the steering motor, thereby controlling the reaction motor and the steering motor. Accordingly, it is possible to reduce manufacturing costs due to a decrease in the number of sensors and electronic control units. In addition, when the current sensor is provided, since estimated values of the state variables calculated by the state variable estimator can be used to sense an error in the current sensor, it is possible to accurately recognize the driver's steering intention even in the event of an error in the current sensor.

According to the present disclosure, since the driver's steering intention can be accurately recognized even when the torque sensor is not provided or even when an error occurs in the torque sensor, it is possible to control the reaction motor and the steering motor by accurately calculating the reaction torque provided to the reaction motor and the steering torque provided to the steering motor.

In addition, according to the present disclosure, it is possible to generate steering reaction force that accurately reflects the state of a vehicle using the tuning technique used in the conventional electric power steering system. Therefore, the present disclosure makes it possible to easily implement performance similar to that of a conventional electric power steering system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
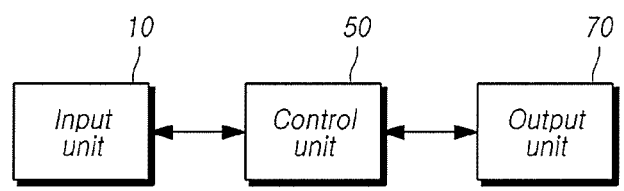
FIG. 1 is a block diagram of a Steer-By-Wire system according to the present disclosure.

The present disclosure may have various modifications and embodiments, and thus particular embodiments illustrated in the drawings will be described in detail in the following description. However, it should be understood that the present disclosure is not limited to the specific embodiments, but the present disclosure includes all modifications, equivalents, and alternatives within the spirit and the scope of the present disclosure. Further, in the description of the present disclosure, when it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

In addition, terms, such as first, second, A, B, (a), (b) or the like may be used herein when describing components of the present disclosure. These teens are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram of a Steer-By-Wire system according to the present disclosure.

The Steer-By-Wire system according to the present disclosure may estimate state variables from which white noise components, such as torque ripples ($\tau_{cmr}$), are removed using a state variable estimator 60 even when an additional current sensor is not provided, thereby accurately determining the driver's steering intention to thus output accurate reaction torque and steering torque.

The Steer-By-Wire system may include an input unit 10 including a steering wheel 15, a control unit 50 including a state variable estimator 60, and an output unit 70 including wheels 85. The Steer-By-Wire system may the sense state information on a vehicle, which is generated when a driver operates the steering wheel, and may determine reaction torque to be output from a reaction motor using a plurality of state variables estimated based on the state information on the vehicle. Hereinafter, the operation of the Steer-By-Wire system according to the present disclosure will be described in detail with reference to related drawings.

Figure 2:
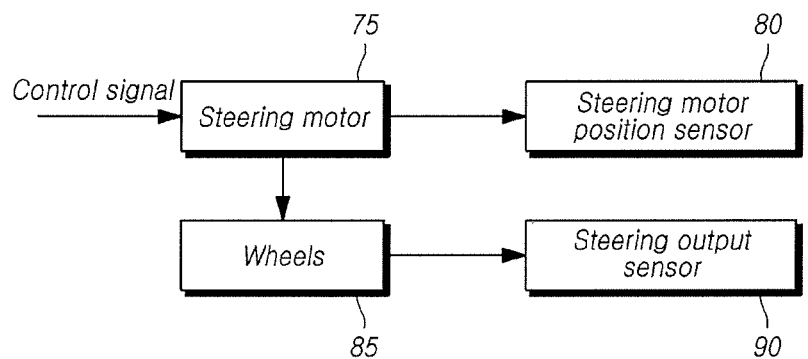
FIG. 2 is a simplified block diagram of an output unit of a Steer-By-Wire system.

FIG. 2 is a simplified block diagram of the output unit 70 in the Steer-By-Wire system.

The output unit 70 may include a steering output sensor 90 for detecting a rotational angle ($\theta_{cm}$) of the wheels 85 on the output side, a steering motor 75 for generating assist force to steer the wheels 85, a steering motor position sensor 80 for sensing the position of a rotation shaft of the steering motor 75, and the like.

A control signal for current, which is calculated by the input unit 10, may be provided to the steering motor 75 of the output unit 70 so that the steering motor 75 may operate to orient the wheels 85 at the steering angle intended by the driver.

Figure 3:
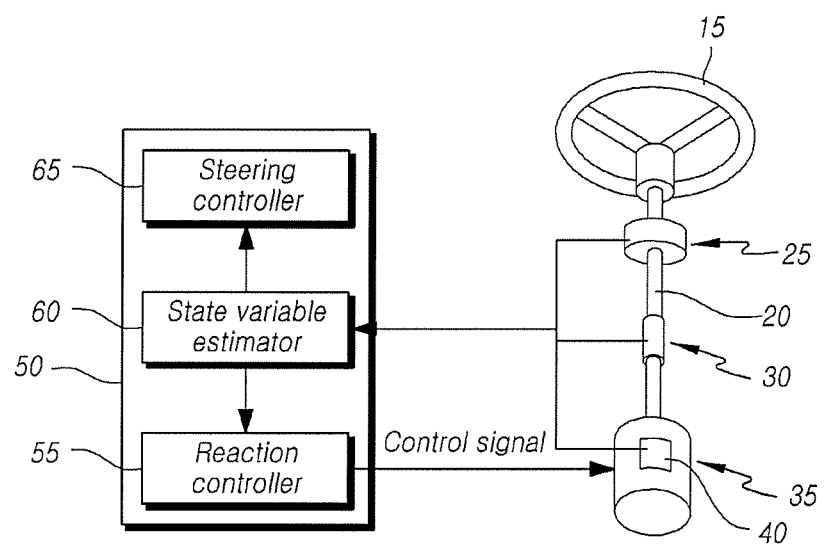
FIG. 3 is a block diagram illustrating a relationship between an input unit and a control unit of a Steer-By-Wire system according to an embodiment of the present disclosure.

FIG. 3 is a block diagram showing the relationship between the input unit 10 and the control unit 50 of the Steer-By-Wire system according to the present disclosure.

The input unit 10 may include a steering wheel 15, a steering angle sensor 25, a torque sensor 30, a reaction motor 35, and a motor position sensor 40, and the control unit 50 may include a reaction controller 55, a state variable estimator 60, and a steering controller 65.

The steering angle sensor 25, the torque sensor 30, and the reaction motor 35 of the input unit 10 may be mounted on a steering column 20, respectively, which is a shaft of the steering wheel 15.

The steering angle sensor 25 may detect a steering angle of the steering wheel 15 when the driver turns the steering wheel 15, and may transmit information on the detected steering angle to the state variable estimator 60.

The torque sensor 30 may sense torsion bar torque generated in the steering column 20 when the driver turns the steering wheel 15, and may transmit the same to the state variable estimator 60.

The reaction motor 35 generates force in the opposite direction of the steering wheel 15 when the driver operates the steering wheel 15 to thus give an appropriate steering feeling to the driver, and the reaction motor 35 for generating a steering feeling is supplied with current in order to generate appropriate reaction torque.

The motor position sensor 40 may generate a voltage signal according to the rotation of the reaction motor 35, and may detect the rotational angle ($\theta_{cm}$) of the reaction motor 35 in real time using the voltage signal. The motor position sensor 40 may transmit information on the rotational angle ($\theta_{cm}$) of the reaction motor 35 to the state variable estimator 60.

The reaction controller 55 of the control unit 50 may perform control such that the reaction motor 35 has the calculated reaction torque, and the steering controller 65 may control the steering motor 75 such that the wheels 85 are oriented at the steering angle intended by the driver.

The state variable estimator 60 may estimate a plurality of state variables for identifying a driver's steering intention using a Kalman filter, and may estimate a plurality of state variables in which white noise components, such as torque ripples ($\tau_{cmr}$), included in the data provided from the steering angle sensor 25, the torque sensor 30, and the motor position sensor 40 of the steering column 20 are removed using the Kalman filter.

The reaction controller 55 receives, from the state variable estimator 60, estimated values of the state variables from which white noise has been removed, determines the reaction torque to be output from the reaction motor 35 using the received estimated values of the plurality of state variables, and outputs a control signal for the reaction motor input voltage to be supplied to the reaction motor 35 so that the reaction motor 35 outputs the determined reaction torque.

To this end, the reaction controller 55 has information on reaction torque reference values corresponding to the state variables estimated by the state variable estimator 60 and determines the reaction torque using the state variables received from the state variable estimator 60. In addition, the reaction controller 55 has information on the reaction motor input voltage, which is to be supplied to the reaction motor 35, such that the reaction motor 35 generates the determined reaction torque. When the reaction torque is determined, the reaction controller 55 generates a control signal such that the reaction motor 35 is supplied with a reaction motor input voltage matching the corresponding reaction torque.

The steering controller 65 may determine the steering torque to be output from the steering motor 75 using the estimated values of the plurality of state variables received from the state variable estimator 60. When the steering torque is determined, the steering controller 65 may output a control signal for a steering motor input voltage, which is supplied to the steering motor 75 such that the steering motor 75 generates the determined steering torque.

To this end, the steering controller 65 has information on steering torque reference values corresponding to the estimated values of the state variables and determines the steering torque using the state variables received from the state variable estimator 60. The steering controller 65 also has information on a steering motor input voltage to be supplied to the steering motor 75 such that the steering motor 75 generates the determined steering torque. When the steering torque is determined, the steering controller 65 generates a control signal such that the steering motor 75 is supplied with a steering motor input voltage matching the corresponding steering torque.

Figure 4:
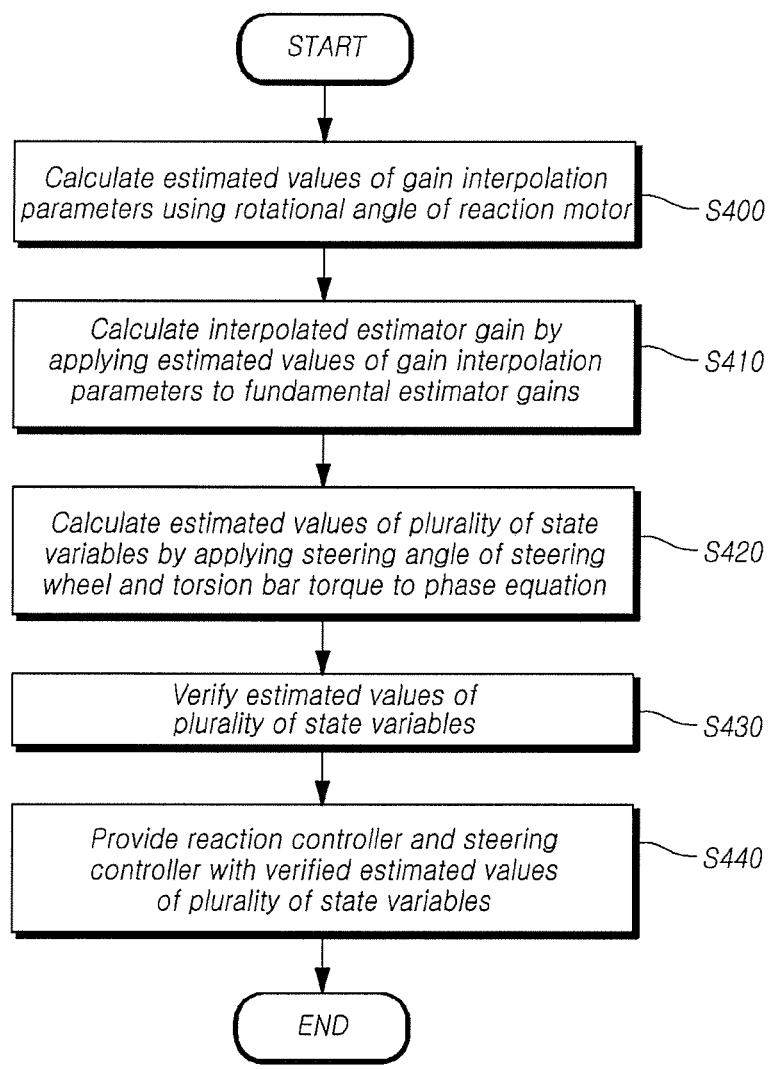
FIG. 4 is a flowchart illustrating a process of estimating state variables in a state variable estimator of a Steer-By-Wire system according to the present disclosure.

The state variable estimator 60, as shown in the flowchart in FIG. 4, may receive information on the steering angle of the steering wheel 15, the torsion bar torque, and the rotational angle ($\theta_{cm}$) of the reaction motor 35 from the steering angle sensor 25, the torque sensor 30, and the motor position sensor 40, respectively, and information on the reaction motor input voltage, which is output from the reaction controller and is input to the reaction motor 35, and may estimate or calculate the angular velocity of the steering wheel 15, the difference between the angular velocity of the steering wheel 15 and the angular velocity of the motor, the driver torque ($\tau_{drv}$), and the phase current using the same.

The state variable estimator 60 calculates fundamental estimator gains for 4 vertices defined using the Kalman filter and has the calculated fundamental estimator gains for 4 vertices. The estimator gains for 4 vertices may be defined as Equations 1 to 4 below.

$$K_1 = \text{kalman}(A_{z\_a}^{(1)} C_{z\_a}, W, V) \qquad \text{[Equation 1]}$$

$$K_2 = \text{kalman}(A_{z\_a}^{(2)} C_{z\_a}, W, V) \qquad \text{[Equation 2]}$$

$$K_3 = \text{kalman}(A_{z\_a}^{(3)} C_{z\_a}, W, V) \qquad \text{[Equation 3]}$$

$$K_4 = \text{kalman}(A_{z\_a}^{(4)} C_{z\_a}, W, V) \qquad \text{[Equation 4]}$$

Here, the 4 vertices may be defined as $v_1$, $v_2$, $v_3$, and $v_4$ of the matrix, respectively, as shown in Equation 5 below.

$$V = [\, v_1 \ \ v_2 \ \ v_3 \ \ v_4 \,] = \begin{bmatrix} \underline{\lambda_1} & \overline{\lambda}_1 & 0 & 0 \\ 0 & 0 & \underline{\lambda_2} & \overline{\lambda}_2 \end{bmatrix} = \begin{bmatrix} -\sqrt{2} & \sqrt{2} & 0 & 0 \\ 0 & 0 & -\sqrt{2} & \sqrt{2} \end{bmatrix} \quad \text{[Equation 5]}$$

The state variable estimator 60 may calculate gain interpolation parameters using the information on the rotational angle ($\theta_{cm}$) of the reaction motor 35, which is received from the motor position sensor 40 (S400). Here, the rotational angle ($\theta_{cm}$) of the reaction motor 35 and the wavelengths ($\lambda 1$ and $\lambda 2$) may be defined as Equation 6 below.

$$\lambda_1(\theta_{cm}) = \sqrt{2}\, \sin(P\theta_{cm}), \ \lambda_2(\theta_{cm}) = \sqrt{2}\, \cos(P\theta_{cm})$$

$$-\sqrt{2} = \underline{\lambda}_1 \le \lambda_1(\theta_{cm}) \le \overline{\lambda}_1 = \sqrt{2}$$

$$-\sqrt{2} = \underline{\lambda}_2 \le \lambda_2(\theta_{cm}) \le \overline{\lambda}_2 = 1$$

$$\Lambda(\theta_{cm}) = [\lambda_1(\theta_{cm})\, \lambda_2(\theta_{cm})]^\tau \quad \text{[Equation 6]}$$

In addition, the vector of the gain interpolation parameters ($\xi_1$, $\xi_2$, $\xi_3$, and $\xi_4$) may be defined as Equation 7 below.

$$\hat{V}\xi = \begin{bmatrix} \xi_1 \\ \xi_2 \\ \xi_3 \\ \xi_4 \end{bmatrix} = \begin{bmatrix} \lambda_1(\theta_{cm}) \\ \lambda_2(\theta_{cm}) \\ 0.5 \\ 0.5 \end{bmatrix} \quad \text{[Equation 7]}$$

Therefore, the gain interpolation parameter ($\xi$) may be defined as Equation 8 below.

$$\cdot \xi = \hat{V}^{-1} \begin{bmatrix} \lambda_1(\theta_{cm}) \\ \lambda_2(\theta_{cm}) \\ 0.5 \\ 0.5 \end{bmatrix} \quad \text{[Equation 8]}$$

Here, the vector ($\hat{V}$) may be defined as the following Equation 9 by applying Equation 5 thereto.

$$\begin{bmatrix} -\sqrt{2} & \sqrt{2} & 0 & 0 \\ 0 & 0 & -\sqrt{2} & \sqrt{2} \\ 1 & 1 & 0 & 0 \\ 0 & 0 & 1 & 1 \end{bmatrix} \quad \text{[Equation 9]}$$

The gain interpolation parameters ($\xi_1$, $\xi_2$, $\xi_3$, and $\xi_4$) may be expressed as the following Equation 10 by applying the vector and the definition of the rotational angle ($\theta_{cm}$) of the reaction motor 35, which are defined in Equation 9 and Equation 6, to Equation 8.

$$\xi = \begin{bmatrix} \xi_1 \\ \xi_2 \\ \xi_3 \\ \xi_4 \end{bmatrix} = \hat{V}^{-1} \begin{bmatrix} \lambda_1(\theta_{cm}) \\ \lambda_2(\theta_{cm}) \\ 0.5 \\ 0.5 \end{bmatrix} = \quad \text{[Equation 10]}$$

$$\begin{bmatrix} -\sqrt{2} & \sqrt{2} & 0 & 0 \\ 0 & 0 & -\sqrt{2} & \sqrt{2} \\ 1 & 1 & 0 & 0 \\ 0 & 0 & 1 & 1 \end{bmatrix}^{-1} \begin{bmatrix} \dfrac{\sin(P\theta_{cm})}{\sqrt{2}} \\ \dfrac{\cos(P\theta_{cm})}{\sqrt{2}} \\ 0.5 \\ 0.5 \end{bmatrix}$$

When the rotational angle ($\theta_{cm}$) of the reaction motor 35 is input to Equation 10, the state variable estimator 60 may calculate estimated values of the gain interpolation parameters ($\xi_1$, $\xi_2$, $\xi_3$, and $\xi_4$).

When the estimated values of the gain interpolation parameters ($\xi_1$, $\xi_2$, $\xi_3$, and $\xi_4$) are calculated, the state variable estimator 60 may calculate an interpolated estimator gain using the estimated values of the calculated gain interpolation parameters ($\xi_1$, $\xi_2$, $\xi_3$, and $\xi_4$) and (S410).

The interpolated estimator gain $K(\theta_{cm})$ may be defined as Equation 8 below.

$$K(\theta_{cm}) = [\, K_1 \ \ K_2 \ \ K_3 \ \ K_4 \,] \begin{bmatrix} \xi_1 \\ \xi_2 \\ \xi_3 \\ \xi_4 \end{bmatrix} \quad \text{[Equation 11]}$$

That is, the estimated values of the gain interpolation parameters are applied to the fundamental estimator gains defined as Equations 1 to 4, thereby calculating the interpolated estimator gain.

When the interpolated estimator gain is calculated, the state variable estimator 60 may receive the steering angle of the steering wheel 15 and the torsion bar torque from the steering angle sensor 25 and the torque sensor 30, and may apply the same to the following Equation 12, which is a differential phase equation, thereby calculating estimated values of a plurality of state variables from which torque ripples ($\tau_{cmr}$) are removed (S420). In this case, the estimated values of the state variables may include driver torque ($\tau_{drv}$), a steering angle of the steering wheel 15, the angular velocity of steering of the steering wheel 15, torsion bar torque, the difference in the angular velocity between the steering wheel and the motor, a phase current, and the like.

The angular velocity of steering of the steering wheel 15 may be calculated by dividing the steering angle sensed by the steering angle sensor 25 by a unit time, and the angular velocity of the motor may be calculated by dividing the rotational angle of the reaction motor, which is sensed by the motor position sensor 40, by a unit time. The difference in the angular velocity between the steering wheel 15 and the motor may be obtained from the difference between the angular velocity of steering and the angular velocity of the motor.

$$\hat{\dot{z}}_a = A_{z\_a}(\Lambda(\theta_{cm}))\hat{z}_a + B_{z\_a} u + K(\theta_{cm})(y - \hat{y}) \quad \text{Equation12]}$$

The differential phase equation of Equation 9 is obtained through transformation by differentiating the existing phase equation of Equation 13 and by applying the Kalman filter for estimating a plurality of state variables.

$$\dot{z}_a = A_{z\_a}(\Lambda(\theta_{cm})) \hat{z}_a + B_{z\_a} u + B_1 \alpha_1(t) + B_2 \alpha_2(t) \quad \text{[Equation 13]}$$

Here, $A_{z\_a}(\Lambda(\theta_{cm}))$, u, Za, $B_1$, $B_2$, $\alpha_1(t)$, and $\alpha_2(t)$ in the phase equation of Equation 10 may be defined as the following Equations 14 to 20, respectively.

$$A_{z\_a}(\Lambda(\theta_{cm})) = \begin{bmatrix} 0_{2\times 1} & 0_{2\times 1} & 0_{6\times 6} \\ B_{z\_drv} & B_{z\_w} & A_z(\Lambda(\theta_{cm})) \end{bmatrix}$$ [Equation 14]

$$u = [\, v_\alpha \quad v_\beta \,]^T$$ [Equation 15]

$$Z_a = \begin{bmatrix} \tau_{drv} \\ \tau_{cmr} \\ Z \end{bmatrix}$$ [Equation 16]

$$A_{zn\_a} = \begin{bmatrix} 0_{2\times 1} & 0_{2\times 1} & 0_{2\times 6} \\ B_{z\_drv} & B_{z\_w} & A_{zn} \end{bmatrix}$$ [Equation 25]

$$\overline{A}_{z\_a}^{(1)} = \begin{bmatrix} 0_{2\times 1} & 0_{2\times 1} & 0_{2\times 6} \\ 0_{6\times 1} & 0_{6\times 1} & \overline{A}_z^{(1)} \end{bmatrix}$$ [Equation 26]

$$\overline{A}_{z\_a}^{(2)} = \begin{bmatrix} 0_{2\times 1} & 0_{2\times 1} & 0_{2\times 6} \\ 0_{6\times 1} & 0_{6\times 1} & \overline{A}_z^{(2)} \end{bmatrix}$$ [Equation 27]

$$A_{zn} = \begin{bmatrix} 0 & 1 & 0 & 0 & 0 & 0 \\ 0 & -\dfrac{B_{sw}}{J_{sw}} & -\dfrac{1}{J_{sw}} & -\dfrac{B_{sen}}{J_{sw}} & 0 & 0 \\ 0 & 0 & 0 & K_{sen} & 0 & 0 \\ 0 & -\dfrac{B_{sw}J_{cm}-B_{cm}J_{sw}}{J_{cm}J_{sw}} & -\dfrac{J_{cm}+J_{sw}}{J_{cm}J_{sw}} & -\dfrac{B_{cm}J_{sw}+B_{sen}J_{sw}+B_{sen}J_{cm}}{J_{sw}J_{cm}} & 0 & 0 \\ 0 & 0 & 0 & 0 & -\dfrac{R_m}{L_m} & 0 \\ 0 & 0 & 0 & 0 & 0 & -\dfrac{R_m}{L_m} \end{bmatrix}$$ [Equation 28]

$$\overline{A}_z^{(1)} = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & \dfrac{K_m}{\sqrt{2}\,J_{cm}} & 0 \\ 0 & \dfrac{K_e}{\sqrt{2}\,L_m} & 0 & -\dfrac{K_e}{\sqrt{2}\,L_m} & 0 & 0 \\ 0 & 0 & 0 & 0 & 0 & 0 \end{bmatrix}$$ [Equation 29]

$$\overline{A}_z^{(2)} = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & -\dfrac{K_m}{\sqrt{2}\,J_{cm}} & 0 \\ 0 & 0 & 0 & 0 & 0 & 0 \\ 0 & -\dfrac{K_e}{\sqrt{2}\,L_m} & 0 & \dfrac{K_e}{\sqrt{2}\,L_m} & 0 & 0 \end{bmatrix}$$ [Equation 30]

-continued $$B_1 = \begin{bmatrix} 1 \\ 0_{5\times 1} \end{bmatrix}$$ [Equation 17]

$$B_2 = \begin{bmatrix} 0 \\ 1 \\ 0_{4\times 1} \end{bmatrix}$$ [Equation 18]

$$\tau_{drv} = \alpha_1(t)$$ [Equation 19]

$$\tau_{cmr} = \alpha_2(t)$$ [Equation 20]

Meanwhile, the matrix of the state variable estimator 60 in 4 vertices may be defined as the following Equations 21 to 24.

$$A_{z\_a}^{(1)} = A_{zn\_a} + \underline{\lambda}_1 \overline{A}_{z\_a}^{(1)}$$ [Equation 21]

$$A_{z\_a}^{(2)} = A_{zn} + \overline{\lambda}_1 \overline{A}_{z\_a}^{(1)}$$ [Equation 22]

$$A_{z\_a}^{(3)} = A_{zn\_a} + \underline{\lambda}_2 \overline{A}_{z\_a}^{(2)}$$ [Equation 23]

$$A_{z\_a}^{(4)} = A_{zn} + \overline{\lambda}_2 \overline{A}_{z\_a}^{(2)}$$ [Equation 24]

Here, the respective variables of Equations 21 to 24 may be defined as the following Equations 25 to 30.

As shown in Equation 31 below, the matrix of the state variable estimator 60 by means of the interpolation parameter vector may be defined by applying the interpolation parameters of Equation 7 to the matrix of the state variable estimator 60 in 4 vertices.

[Equation 31]

$$A_{z\_a}(\Lambda(\theta_{cm})) = \xi_1 A_{z\_a}^{(1)} + \xi_2 A_z^{(1)} + \xi_3 A_{z\_a}^{(3)} + \xi_4 A_{z\_a}^{(4)}$$ [Equation 31]

The state variable estimator 60 may compare the estimated values of the state variables with the state variables sensed by the torque sensor 30, the steering angle sensor 25, and the motor position sensor 40, thereby performing a process of verifying whether or not the values of the state variables estimated by the state variable estimator 60 are correct (S430). If the differences between the values of the state variables estimated by the state variable estimator 60 and the state variables sensed by the torque sensor 30, the steering angle sensor 25, and the motor position sensor 40 are equal to or more than a specific value, the state variable estimator 60 may perform the estimation of the state variables again.

When the verification is completed, the estimated values of the state variables calculated by the state variable estimator 60 may be provided to the reaction controller 55 and the steering controller 65, respectively (S440).

Figure 5:
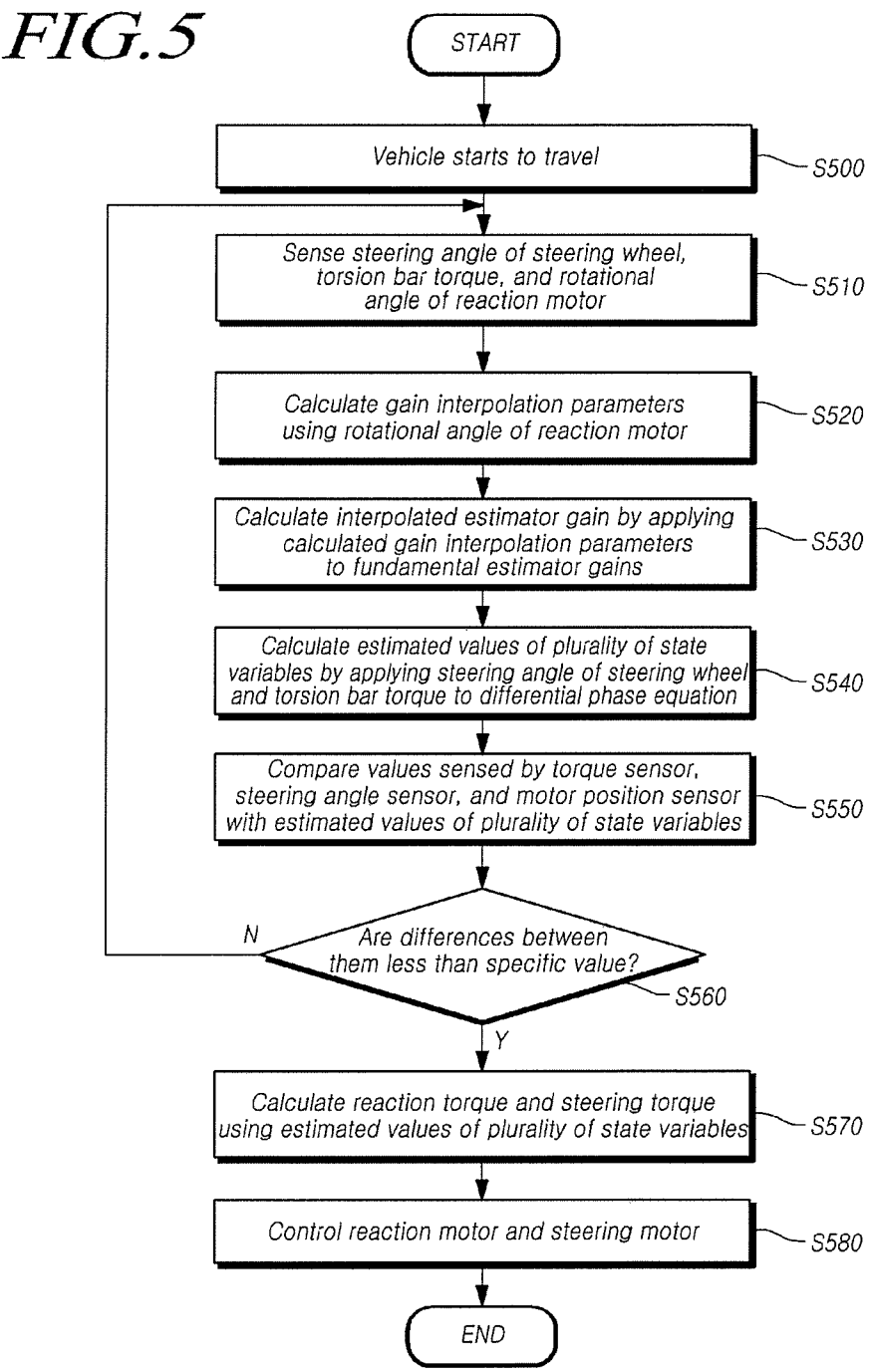
FIG. 5 is a flowchart illustrating a control process of a Steer-By-Wire system according to the present disclosure.

The process of calculating the estimated values of the state variables for determination of the reaction torque using the state variable estimator 60 in the Steer-By-Wire system having the above configuration will now be described with reference to FIG. 5.

Once the vehicle starts to travel (S500), the steering angle sensor 25, the torque sensor 30, and the motor position sensor 40 may sense the steering angle of the steering wheel 15, the torsion bar torque, and the rotational angle ($\theta_{cm}$) of the reaction motor 35, and may transmit the same to the state variable estimator 60 (S510).

The state variable estimator 60 may apply information on the rotational angle ($\theta_{cm}$) of the reaction motor 35 received from the motor position sensor 40 to Equation 7, thereby calculating gain interpolation parameters (S520).

The state variable estimator 60 may have fundamental estimator gains for 4 vertices, and the state variable estimator 60 may apply the calculated gain interpolation parameters to the fundamental estimator gains defined by the Kalman filter, thereby calculating an interpolated estimator gain (S530).

When the interpolated estimator gain is calculated, the state variable estimator 60 may apply the steering angle of the steering wheel 15 and the torsion bar torque to Equation 9, thereby calculating estimated values of the state variables from which torque ripples ($\tau_{cmr}$) are removed (S540). The estimated values of the state variables may include the driver torque ($\tau_{drv}$), the steering angle of the steering wheel 15, the angular velocity of steering of the steering wheel 15, the torsion bar torque, the difference in the angular velocity between the steering wheel and the motor, the phase current, and the like. The angular velocity of steering of the steering wheel 15 may be calculated by dividing the steering angle, sensed by the steering angle sensor 25, by a unit time, and the angular velocity of the motor may be calculated by dividing the rotational angle of the reaction motor, which is sensed by the motor position sensor 40, by a unit time. The difference in the angular velocity between the steering wheel 15 and the motor may be obtained from the difference between the angular velocity of steering and the angular velocity of the motor.

The state variable estimator 60 may compare the calculated estimated values of the state variables with the steering angle of the steering wheel 15, the torsion bar torque, and the rotational angle ($\theta_{cm}$) of the reaction motor 35 sensed by the steering angle sensor 25, the torque sensor 30, and the motor position sensor 40 (S550). If the differences between the estimated values of the state variables calculated by the state variable estimator 60 and the state variables sensed by the respective sensors are equal to or more than a predetermined specific value (S560-N), the state variable estimator 60 may estimate the state variables again until the differences become less than the specific value.

The estimated values of the plurality of state variables, which are calculated and verified in the state variable estimator 60, may be provided to the reaction controller 55 and the steering controller 65 (S570). The reaction controller 55 may determine the reaction torque of the reaction motor 35 using the estimated values of the state variables, and may provide the reaction motor 35 with a control signal for the motor input voltage corresponding to the determined reaction torque. The steering controller 65 may determine the steering torque of the steering motor 75 using the estimated values of the state variables, and may provide the steering motor 75 with a control signal for the steering motor input voltage corresponding to the determined steering torque (S580).

Although a description has been made of the case in which the current sensor is not provided in the above embodiment, in the case where a current sensor is provided, a phase current value of the reaction motor 35 sensed by the current sensor may be verified by comparing the phase current value sensed by the current sensor with a phase current value estimated by the state variable estimator 60.

If the difference between the phase current value sensed by the current sensor and the phase current value estimated by the state variable estimator 60 exceeds a specific value, it may be determined that an error has occurred in the current sensor, and control of the reaction motor 35 and the steering motor 75 may be performed using the phase current value estimated by the state variable estimator 60. That is, when the current sensor is provided, an error of the current sensor may be determined using the state variable estimator 60, and even when an error occurs in the current sensor, it is possible to accurately recognize the driver's steering intention using the phase current value estimated by the state variable estimator 60.

As described above, in the Steer-By-Wire system according to the present disclosure, it is possible to calculate estimated values of the state variables including the driver torque ($\tau_{drv}$) from which torque ripples ($\tau_{cmr}$) are removed, the steering angle of the steering wheel 15, the angular velocity of steering of the steering wheel 15, the torsion bar torque, the difference in the angular velocity between the steering wheel and the motor, the phase current, and the like using the state variable estimator 60 by means of the Kalman filter. Therefore, it is possible to accurately recognize the driver's steering intention even when a separate sensor, such as a current sensor, is not provided. Thus, the reaction torque provided to the reaction motor 35 and the steering torque provided to the steering motor 75 may be accurately calculated, thereby controlling the reaction motor 35 and the steering motor 75. In addition, even when the current sensor is provided, the estimated values of the state variables, which are calculated by the state variable estimator 60, may be used to sense an error in the current sensor.

Figure 6:
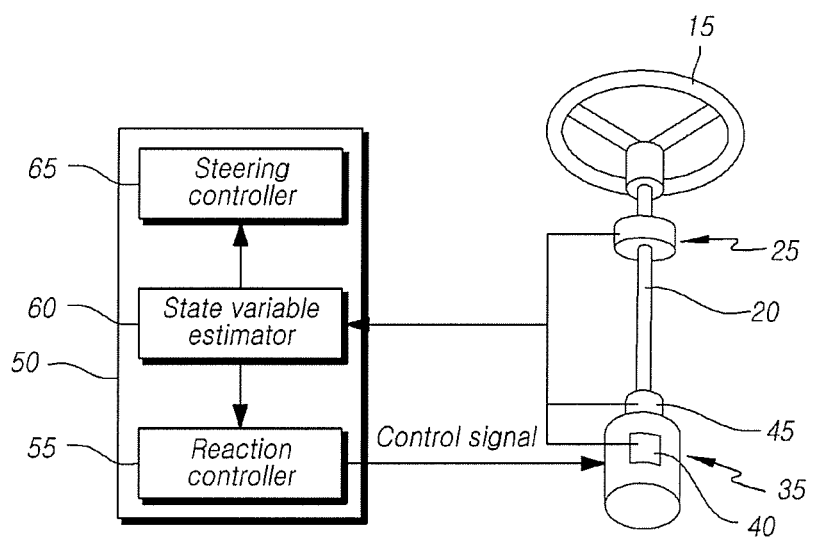
FIG. 6 is a block diagram illustrating a relationship between an input unit and a control unit of a Steer-By-Wire system according to another embodiment of the present disclosure.

FIG. 6 is a block diagram illustrating the relationship between an input unit 10 and a control unit 50 of a Steer-By-Wire system according to another embodiment of the present disclosure.

The input unit 10 may include a steering wheel 15, a steering angle sensor 25, a reaction motor 35, a motor position sensor 40, and a current sensor 45, and the control unit 50 may include a reaction controller 55, a state variable estimator 60, and a steering controller 65.

The steering angle sensor 25 may detect the steering angle of the steering wheel 15 when the driver turns the steering wheel 15, and may transmit information on the detected steering angle to the state variable estimator 60.

The reaction motor 35 generates force in the opposite direction of the steering wheel 15 when the driver operates the steering wheel 15, thereby providing the driver with an appropriate steering feeling, and the reaction motor 35 for generating a steering feeling is supplied with current for generating appropriate reaction torque.

The motor position sensor 40 may generate a voltage signal according to the rotation of the reaction motor 35, and may detect the rotational angle ($\theta_{cm}$) of the reaction motor 35 in real time using the voltage signal. The motor position sensor 40 may transmit information on the rotational angle ($\theta_{cm}$) of the reaction motor 35 to the state variable estimator 60.

The current sensor 45 may sense the phase current of the reaction motor, and may acquire the fundamental wave current in one PWM period (i.e., the average current). In general, a pair of current sensors 45 is provided to sense the phase current, and sensing of the phase current is essential for torque control.

The reaction controller 55 of the control unit 50 may perform control such that the reaction motor 35 has the calculated reaction torque, and the steering controller 65 may control the steering motor 75 such that the wheels 85 are oriented at the steering angle intended by the driver.

The state variable estimator 60 may estimate a plurality of state variables for recognizing the driver's steering intention using the Kalman filter, and, due to the use of the Kalman filter, the state variable estimator 60 may estimate a plurality of state variables using data received from the steering angle sensor 25, the motor position sensor 40, and the current sensor 45 on the steering column 20.

The reaction controller 55 receives estimated values of the plurality of state variables from the state variable estimator 60, determines reaction torque to be output from the reaction motor 35 using the received estimated values of the plurality of state variables, and outputs a control signal for the reaction motor input voltage, which is provided to the reaction motor 35 so that the determined reaction torque is output from the reaction motor 35.

To this end, the reaction controller 55 has information on reaction torque reference values corresponding to the state variables estimated by the state variable estimator 60, and determines the reaction torque using the state variables received from the state variable estimator 60. In addition, the reaction controller 55 has information on the reaction motor input voltage to be provided to the reaction motor 35 in order for the reaction motor 35 to generate the determined reaction torque, and when the reaction torque is determined, the reaction controller 55 generates a control signal such that a reaction motor input voltage matching the corresponding reaction torque is supplied to the reaction motor 35.

The reaction controller 55 may receive the estimated values of all of the state variables from the state variable estimator 60. Alternatively, the reaction controller 55 may receive information on the steering angle of the steering wheel 15, the rotational angle ($\theta_{cm}$) of the reaction motor 35, and the phase current directly from the steering angle sensor 25, the motor position sensor 40, and the current sensor 45, respectively, and may receive, from the state variable estimator 60, estimated values of state variables other than the same.

The steering controller 65 may determine the steering torque to be output from the steering motor 75 using the estimated values of the plurality of state variables received from the state variable estimator 60. Once the steering torque is determined, the steering controller 65 may output a control signal for the steering motor input voltage to be provided to the steering motor 75 in order for the steering motor 75 to generate the determined steering torque.

To this end, the steering controller 65 has information on the steering torque reference values corresponding to the estimated values of the state variables and determines the steering torque using the state variables received from the state variable estimator 60. The steering controller 65 also has information on the steering motor input voltage to be provided to the steering motor 75 such that the steering motor 75 generates the determined steering torque, and when the steering torque is determined, the steering controller 65 generates a control signal such that a steering motor input voltage matching the steering torque is supplied to the steering motor 75.

Figure 7:
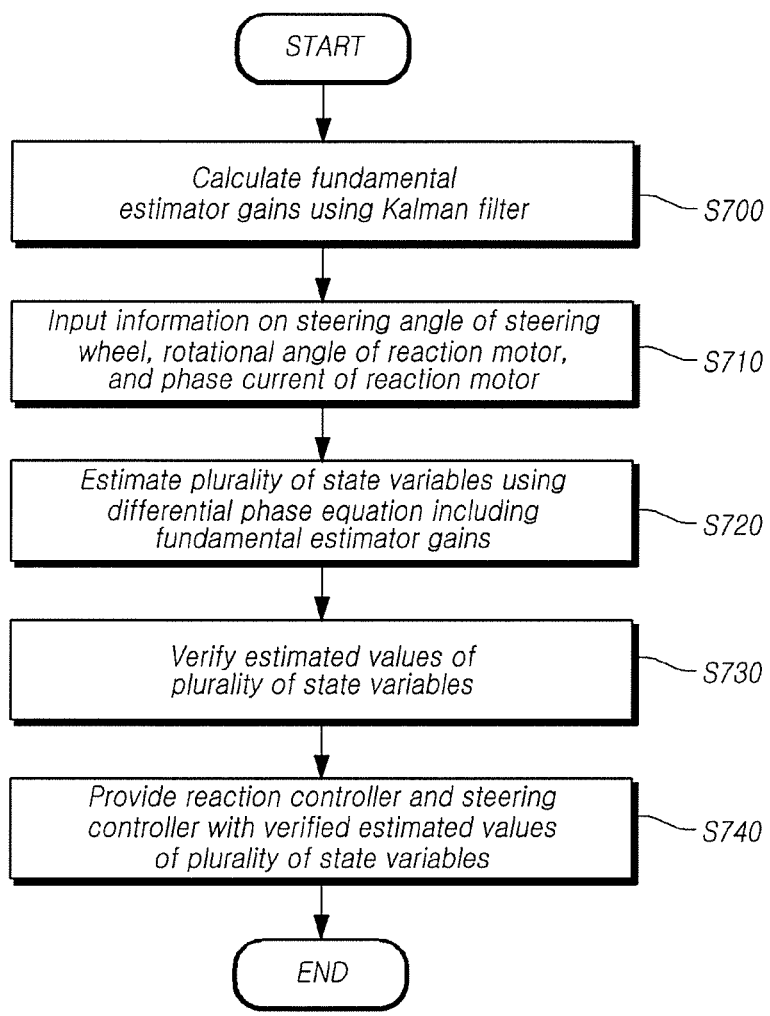
FIG. 7 is a flowchart illustrating a process of estimating state variables in a state variable estimator of a Steer-By-Wire system according to another embodiment of the present disclosure.

The state variable estimator 60, as shown in the flowchart in FIG. 7, may receive information on the steering angle of the steering wheel 15, the rotational angle ($\theta_{cm}$) of the reaction motor 35, and the phase current of the reaction motor 35 from the steering angle sensor 25, the motor position sensor 40, and the current sensor 45, respectively, and may estimate or calculate the angular velocity of the steering wheel 15, the difference in the angular velocity between the steering wheel 15 and the motor, and the driver torque ($\tau_{drv}$) using the same.

The state variable estimator 60 calculates a fundamental estimator gain (K) defined using the Kalman filter and has information on the calculated fundamental estimator gain (S700). The fundamental estimator gain of the state variable estimator 60 may be defined as Equation 32 below.

$$K = \mathrm{kalman}(A_{R\_a}, C_{R\_a}, W, V) \quad \text{[Equation 32]}$$

When information on the steering angle of the steering wheel 15, the rotational angle ($\theta_{cm}$) of the reaction motor 35, and the phase current of the reaction motor 35 is input to the state variable estimator 60 (S710), the state variable estimator 60 may substitute the information into the differential phase equation of Equation 33, thereby calculating estimated values of the plurality of state variables (S720).

The plurality of state variables may include the driver torque, the steering angle of the steering wheel 15, the angular velocity of steering of the steering wheel 15, the torsion bar torque, the difference between the angular velocity of steering of the steering wheel 15 and the angular velocity of the reaction motor, and the like. The angular velocity of steering of the steering wheel 15 may be calculated by dividing the steering angle sensed by the steering angle sensor 25 by a unit time, and the angular velocity of the motor may be calculated by dividing the torsion bar torque, which is sensed by the motor position sensor 40, by a unit time. The difference in the angular velocity between the steering wheel 15 and the motor may be obtained by means of the difference between the angular velocity of steering and the angular velocity of the motor.

$$\dot{Z}_a = A_{R\_a} \hat{z}_a + B_{1\_a} u_R + K(y_R - \hat{y}_R) \quad \text{[Equation 33]}$$

Here, K represents the fundamental estimator gain in Equation 32, and $y_R$ may be expressed as Equation 34 below.

$$y_R = C_{R\_a} = [\, 0 \quad C_R \,] z_a \quad \text{[Equation 34]}$$

Here, $C_R$ may be defined as Equation 35, and $Z_a$ may be defined as Equation 36.

$$y_R = C_R z_r = [1 \quad 0 \quad 0 \quad 0] z_r \quad \text{[Equation 35]}$$

$$z_a = \begin{bmatrix} \tau_{drv} \\ z_R \end{bmatrix} \quad \text{[Equation 36]}$$

Here, $\tau_{drv}$ represents the driver torque, and $Z_R$ may be defined as Equation 37 below.

$$z_R = [z_1 \quad z_2 \quad z_3 \quad z_4] = [\theta_{sw} \quad \omega_{sw} \quad \tau_t \quad \omega_d] \quad \text{[Equation 37]}$$

Here, $\theta_{sw}$, $\omega_{sw}$, $\tau_t$, $\omega_d$ represent the steering angle of the steering wheel 15, the angular velocity of steering of the steering wheel 15, the torsion bar torque, and the angular velocity of the reaction motor, respectively.

The differential phase equation of Equation 33 is obtained through transformation by differentiating the phase equation of the following Equation 38 and by applying the Kalman filter for estimating a plurality of state variables.

$$\dot{z}_a = A_{R\_a} z_a + B_{1\_a} u_R + B_{2\_a} \alpha_1(t) \quad \text{[Equation 38]}$$

Here, $A_{R\_a}$, $B_{1\_a}$, $B_{2\_a}$, $u_R$, $\alpha_1$(t) included in the phase equation may be defined as the following Equations 39 to 43, respectively. $A_{R\_a}$ of the phase equation may be defined as Equation 39.

$$A_{R\_a} = \begin{bmatrix} 0 & 0_{1\times 4} \\ B_2 & A_R \end{bmatrix} \quad \text{[Equation 39]}$$

Here, $B_2$ and $A_R$ may be defined as the following Equations 40 and 41, respectively.

$$B_2 = \begin{bmatrix} 0 & 0 & 0 & -\dfrac{1}{J_{cm}} \end{bmatrix} \quad \text{[Equation 40]}$$

$$A_R = \begin{bmatrix} 0 & 1 & 0 & 0 \\ 0 & -\dfrac{B_{sw}}{J_{sw}} & -\dfrac{1}{J_{sw}} & -\dfrac{B_{sen}}{J_{sw}} \\ 0 & 0 & 0 & K_{sen} \\ 0 & -\dfrac{B_{sw}J_{cm} - B_{cm}J_{sw}}{J_{cm}J_{sw}} & -\dfrac{J_{cm}+J_{sw}}{J_{cm}J_{sw}} & -\dfrac{B_{cm}J_{sw}+B_{sen}J_{sw}+B_{sen}J_{cm}}{J_{sw}J_{cm}} \end{bmatrix} \quad \text{[Equation 41]}$$

Here, $B_{sw}$ is a damping coefficient of the steering wheel, $B_{sen}$ is a damping coefficient of the torsion bar, $B_{cm}$ is a damping coefficient of the reaction motor, $J_{sw}$ the inertia of the steering wheel, and $j_{cm}$ is the inertia of the reaction motor.

$B_{1\_a}$ of the phase equation may be defined as Equation 42.

$$B_{1\_a} = \begin{bmatrix} 0 \\ B_1 \end{bmatrix} \quad \text{[Equation 42]}$$

Here, $B_1$ may be defined as Equation 43 below.

$$B_1 = \begin{bmatrix} 0 & \dfrac{1}{J_{sw}} & 0 & \dfrac{1}{J_{sw}} \end{bmatrix} \quad \text{[Equation 43]}$$

$B_{2\_a}$ of the phase equation may be defined as Equation 44 below.

$$B_{2\_a} = \begin{bmatrix} 1 \\ 0_{4\times 1} \end{bmatrix} \quad \text{[Equation 44]}$$

$U_R$ of the phase equation may be defined as Equation 45 below.

$$u_R = -K_m \sin(P\theta_{cm})i_\alpha + K_m \cos(P\theta_{cm})i_\beta \quad \text{[Equation 45]}$$

Here, $\theta_{cm}$ is the rotational angle of the reaction motor, and $i_\alpha$ and $i_\beta$ are the phase currents sensed by the current sensor 45.

$a_1$(t) of the phase equation may be defined as Equation 46.

$$\dot{\tau}_{drv} = \alpha_1(t) \quad \text{[Equation 46]}$$

Here, $\tau_{drv}$ represents the driver torque.

As described above, the damping coefficient of the steering wheel, the damping coefficient of the torsion bar, the damping coefficient of the reaction motor, the inertia of the steering wheel, and the inertia of the reaction motor, as shown in Equations 38 to 40, are input to the differential phase equation of the state variable estimator 60, which is defined as Equation 33. In addition, the rotational angle of the reaction motor 35 and the phase current sensed by the current sensor 45 are input to the differential phase equation, as shown in Equation 41, and the driver torque and the torsion bar torque may be estimated by applying the Kalman filter using the above values, as shown in Equations 44 to 46.

When estimating the driver torque and the torsion bar torque using the Kalman filter in the state variable estimator 60, the white noise, such as torque ripples, introduced to the steering column may be removed by the Kalman filter.

The state variable estimator 60 may compare the estimated values of the state variables with the state variables sensed by the steering angle sensor 25, the motor position sensor 40, and the current sensor 45, thereby performing a process of verifying whether or not values of the state variables estimated by the state variable estimator 60 are correct (S730). If the differences between the values of the state variables estimated by the state variable estimator 60 and the state variables sensed by the steering angle sensor 25, the motor position sensor 40, and the current sensor 45 are equal to or more than a specific value, the state variable estimator 60 may perform the estimation of the state variables again.

When the verification is completed, the estimated values of the state variables calculated by the state variable estimator 60 may be provided to the reaction controller 55 and the steering controller 65, respectively (S740).

Figure 8:
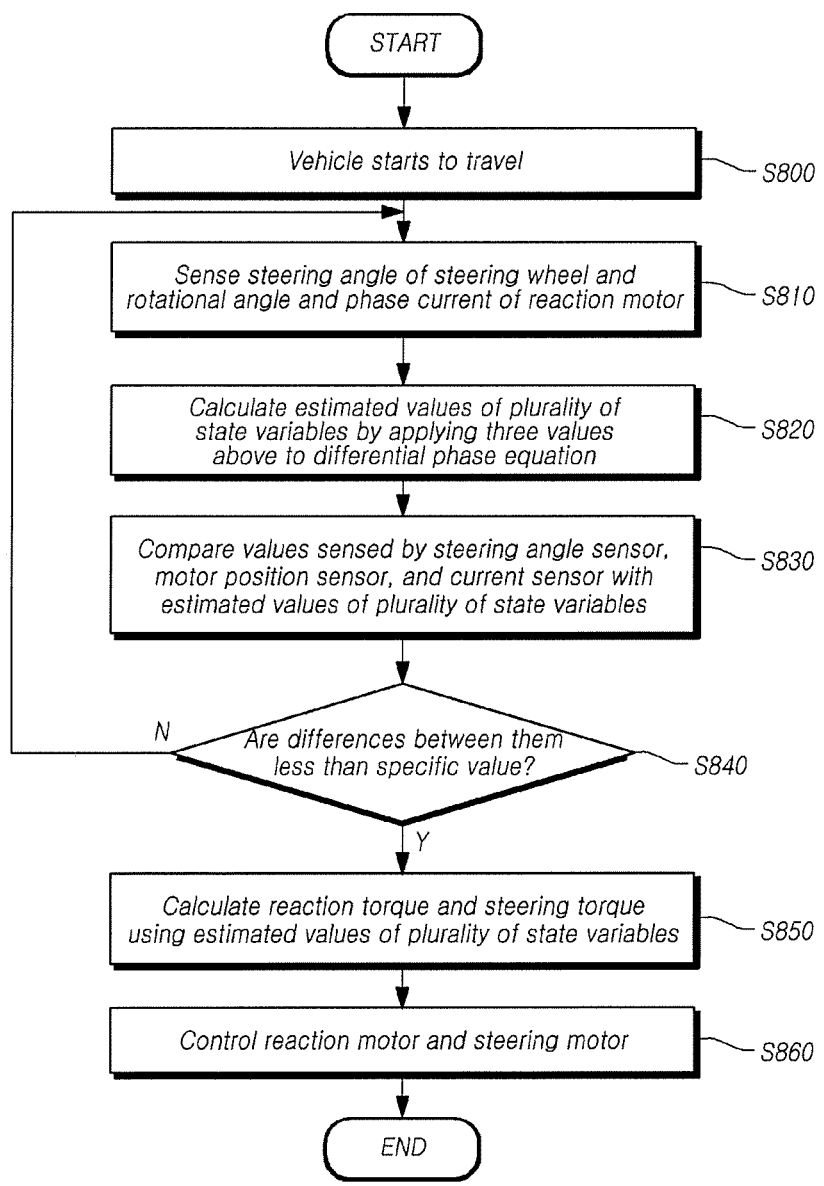
FIG. 8 is a flowchart illustrating a control process of a Steer-By-Wire system according to another embodiment of the present disclosure.

The process of calculating the estimated values of the state variables for determining the reaction torque using the state variable estimator 60 in the Steer-By-Wire system having the above configuration will now be described with reference to FIG. 8.

Once the vehicle starts to travel (S800), the steering angle sensor 25, the motor position sensor 40, and the current sensor 45 may sense the steering angle of the steering wheel 15, the rotational angle ($\theta_{cm}$) of the reaction motor 35, and the phase current value, respectively, and may transmit the same to the state variable estimator 60 (S810).

The state variable estimator 60 may apply, to a differential phase equation, the received steering angle of the steering wheel 15, the rotational angle ($\theta_{cm}$) of the reaction motor 35, and the phase current value and the damping coefficient of the steering wheel 15, the damping coefficient of the torsion bar, the damping coefficient of the reaction motor 35, the inertia of the steering wheel, and the inertia of the reaction motor 35, thereby estimating a plurality of state variables from which the torque ripples are removed (S820).

In this case, the estimated state variables may include the driver torque, the torsion bar torque, the steering angle of the steering wheel 15, the angular velocity of steering of the steering wheel 15, the difference in the angular velocity between the steering wheel 15 and the reaction motor 35, and the like.

The angular velocity of steering of the steering wheel 15 may be calculated by dividing the steering angle, which is sensed by the steering angle sensor 25, by a unit time, and the angular velocity of the motor may be calculated by dividing the torsion bar torque, which is sensed by the motor position sensor 40, by a unit time. The difference in the angular velocity between the steering wheel 15 and the motor may be obtained by means of the difference between the angular velocity of steering and the angular velocity of the motor.

The state variable estimator 60 may compare the calculated estimated values of the state variables with the steering angle of the steering wheel 15 and the rotational angle ($\theta_{cm}$) of the reaction motor 35, which are sensed by the steering angle sensor 25, the motor position sensor 40, and the current sensor 45, and with the phase current value detected by the reaction motor 35 and the motor input voltage provided to the reaction motor 35 (S830). If the differences between the estimated values of the state variables calculated by the state variable estimator 60 and the state variables sensed by the respective sensors are equal to or more than a predetermined specific value (S840-N), the state variable estimator 60 may estimate the state variables again until the differences become less than the specific value.

When the verification is completed, the estimated values of the plurality of state variables calculated and verified by the state variable estimator 60 may be provided to the reaction controller 55 and the steering controller 65, respectively (S850). The reaction controller 55 may determine the reaction torque of the reaction motor 35 using the estimated values of the state variables, and may provide the reaction motor 35 with a control signal for the motor input voltage corresponding to the determined reaction torque. The steering controller 65 may determine the steering torque of the steering motor 75 using the estimated values of the state variables, and may provide the steering motor 75 with a control signal for the steering motor input voltage corresponding to the determined steering torque (S860).

Although a description has been made of the case in which the torque sensor is not provided in the above embodiment, in the case where the torque sensor is provided, the torsion bar torque sensed by the torque sensor may be verified by comparing the same with the torsion bar torque estimated by the state variable estimator 60.

If the difference between the torsion bar torque sensed by the torque sensor and the torsion bar torque estimated by the state variable estimator 60 is equal to or more than a specific value, it is determined that an error has occurred in the torque sensor, so that the reaction motor 35 and the steering motor 75 are controlled using the torsion bar torque estimated by the state variable estimator 60. That is, when the torque sensor is provided, an error of the torque sensor may be determined using the state variable estimator 60, and even when an error occurs in the torque sensor, it is possible to accurately recognize the driver's steering intention using the torsion bar torque estimated by the state variable estimator 60.

As described above, in the Steer-By-Wire system according to the present disclosure, it is possible to calculate estimated values of the state variables including the driver torque from which the torque ripples ($\tau_{cmr}$) are removed, the torsion bar torque, the steering angle of the steering wheel 15, the angular velocity of steering of the steering wheel 15, the difference in the angular velocity between the steering wheel 15 and the reaction motor 35, and the like using the state variable estimator 60 by means of the Kalman filter. Therefore, it is possible to accurately recognize the driver's steering intention even when the torque sensor is not provided. Thus, the reaction torque provided to the reaction motor 35 and the steering torque provided to the steering motor 75 may be accurately calculated, thereby controlling the reaction motor 35 and the steering motor 75. In addition, even when the torque sensor is provided, the estimated values of the state variables, which are calculated by the state variable estimator 60, may be used to sense an error in the torque sensor.

Figure 9:
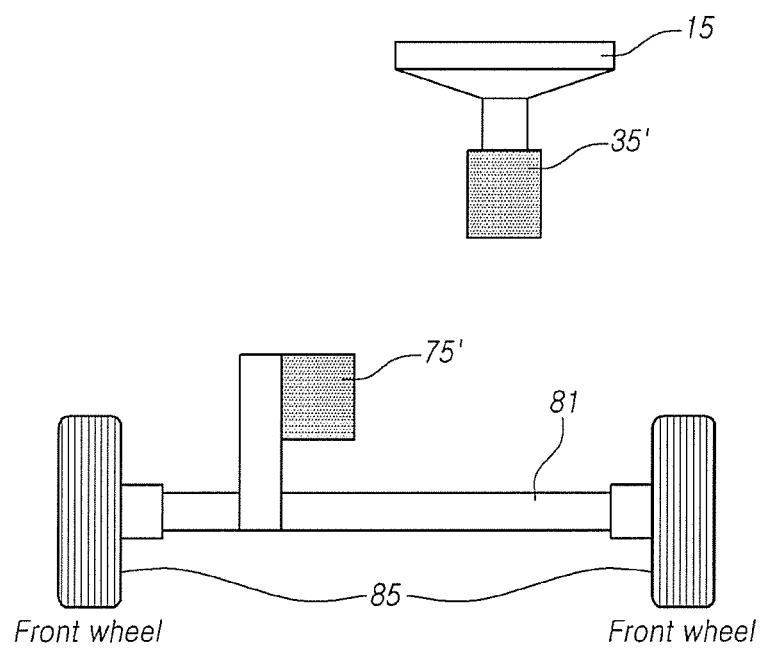
FIG. 9 is a diagram illustrating the configuration of a Steer-By-Wire system related to the present disclosure.

FIG. 9 is a diagram illustrating the configuration of a Steer-By-Wire system related to the present disclosure.

Referring to FIG. 9, unlike the conventional steering control system {i.e., the Electric Power Steering (EPS) system}, an existing Steer-By-Wire system does not have a mechanical connection between a steering wheel 15 and a rack 81. A steering reaction feedback actuator 35' capable of applying steering reaction force to the steering wheel 15 is coupled to the column connected to the steering wheel 15. A front wheel actuator 75' for controlling front wheels is coupled to the rack 81. A reaction motor for applying steering reaction force is coupled to the steering reaction feedback actuator 35', and a steering motor 75 for controlling the front wheels 85 by moving the rack is coupled to the front wheel actuator 75'.

Since there is no mechanical connection between the steering wheel 15 and the rack 81 in the above Steer-By-Wire system, even if the rack gear receives external force when steering the vehicle, the force is not transmitted to the steering wheel. Therefore, there is a need for a device for generating appropriate steering reaction force when steering the vehicle, thereby providing the driver with a steering feeling similar to that provided by the conventional EPS system having a mechanical connection.

More specifically, the conventional EPS system and the steering reaction force generating device of the Steer-By-Wire system are compared in greater detail below.

First, the conventional EPS system calculates manual torque first, and then allows the driver to sense the steering reaction force equal to the difference between the manual torque and the assist torque.

In this case, the manual torque denotes the total torque required to turn the actual steering wheel, which means the torque that the driver must apply in order to control the steering wheel when the assist torque is not provided by the EPS system.

The assist torque denotes the torque provided by a motor of the EPS system to enable the driver to perform steering in a desired direction even with little force.

The assist torque may be obtained by substituting a predetermined assist torque map by the measured vehicle speed and the steering torque value of the driver.

On the other hand, since the Steer-By-Wire system does not have a mechanical connection between the steering wheel and the rack as described above, the above-mentioned manual torque becomes zero. Therefore, it is impossible to utilize the steering reaction force calculation method used in the conventional EPS system, and thus the steering reaction force is derived as a function of rack force in the steering reaction force generating device of the Steer-By-Wire system.

Figure 10:
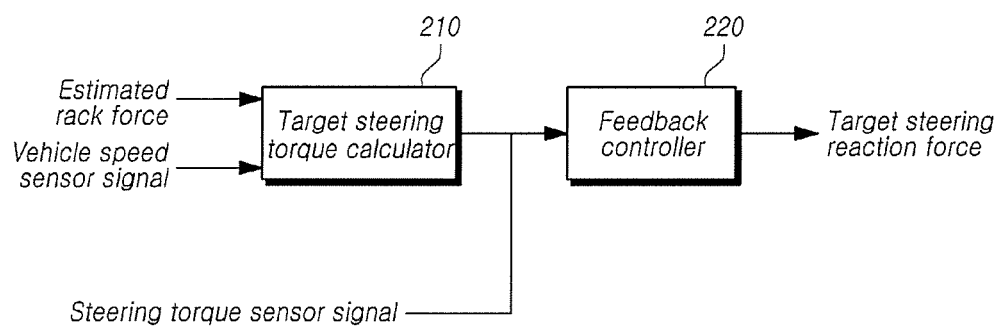
FIG. 10 is a diagram showing the configuration of a steering reaction force generating device of an existing Steer-By-Wire system.

FIG. 10 is a diagram showing the configuration of a steering reaction force generating device of the existing Steer-By-Wire system.

The existing Steer-By-Wire system generates steering reaction force based on the external force (load) applied to the rack gear (i.e., rack force). The existing Steer-By-Wire system, based on the estimated rack force, calculates target steering torque and performs closed-loop control for the same.

More specifically, a target steering torque calculator 210, based on the estimated rack force value and a signal value received from a vehicle speed sensor (i.e., vehicle speed), calculates target steering torque. The rack force value is estimated based on a signal value measured by a motor coupled to the rack gear using predetermined estimation logic in the electronic control unit.

The feedback controller 220 generates target steering reaction force based on a target steering torque value received from the target steering torque calculator 210 and a torque signal received from the steering torque sensor.

As described above, the method of generating the steering reaction force in the Steer-By-Wire system is different from the method of generating the steering reaction force in the conventional EPS system. Therefore, the tuning capability/know-how used to provide an appropriate steering feeling to the driver in the conventional EPS system cannot be directly applied to the Steer-By-Wire system.

Accordingly, the present embodiment, in order to apply the tuning capability/know-how used in the conventional EPS system to the Steer-By-Wire system, proposes a Steer-By-Wire system that calculates virtual manual torque based on state information on the vehicle, which is generated during the steering operation, instead of the rack force, and determines reaction torque based on the same.

Figure 11:
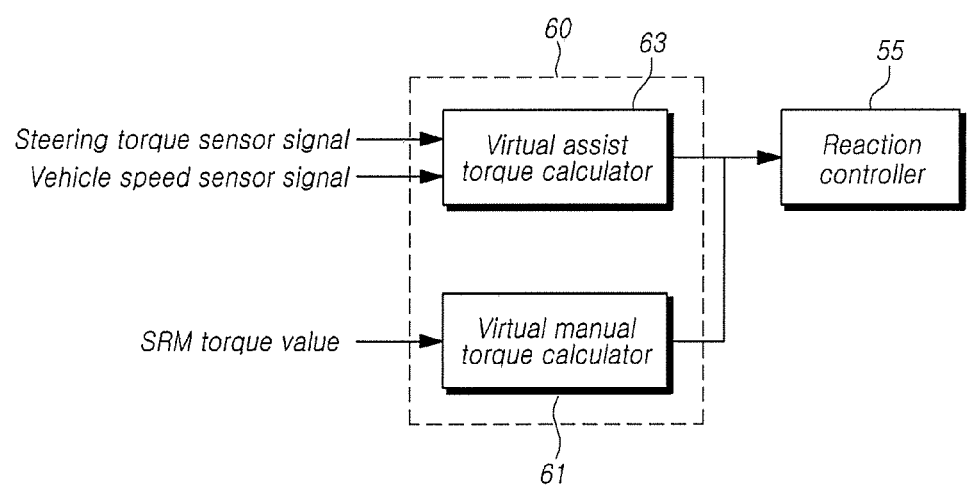
FIG. 11 is a block diagram of a state variable estimator according to another embodiment of the present disclosure.

FIG. 11 is a block diagram of a state variable estimator according to another embodiment of the present disclosure.

Referring to FIG. 11, the state variable estimator of the present embodiment may include a virtual manual torque calculator 61, a virtual assist torque calculator 63, and a reaction controller 55.

The virtual manual torque calculator 61, based on a torque value of a Switched Reluctance Motor (SRM) coupled to the rack gear, may perform a function of calculating a virtual manual torque value.

The SRM is essentially a motor, having stator-and rotor-type poles, combined with a switching control device. The SRM has a simple structure in which wires are wound only about the stator, whereas no wire or permanent magnet is attached to the rotor.

The virtual manual torque value is a torque value required to rotate the steering wheel and control the steering through a virtual steering shaft in the state in which the driver is not assisted by the EPS system, assuming that there is a virtual steering shaft between the rack and the steering wheel.

More specifically, the virtual manual torque value may be calculated by a function having factors, such as a torque value of the SRM described above, a gear ratio of the rack gear, a ball screw lead, and a predetermined virtual factor value.

For example, the function to obtain the virtual manual torque value may be determined as follows.

(virtual manual torque value)=(torque value of SRM)*(gear ratio of rack gear)*(virtual factor)/(ball screw lead)

The ball screw lead is a value indicating the distance that a nut proceeds during one rotation of a screw shaft. When it is assumed that there is a virtual steering shaft connected to the rack gear, the ratio of the rotation of the steering shaft to the linear motion of the rack may be determined by the gear ratio of the rack gear.

Therefore, the torque value to be applied to the virtual steering shaft connected to the rack gear may be obtained by dividing the torque value of the SRM by the ball screw lead and multiplying the same by the gear ratio of the rack gear.

However, since the shaft is a virtual axis and does not exist in the Steer-By-Wire system, a virtual factor value may be multiplied in order to minimize the difference relative to the manual torque value in the presence of the actual shaft. The virtual factor value may be measured through experimentation.

The virtual assist torque calculator 63, based on a signal value received from the steering torque sensor and a signal value received from the vehicle speed sensor, may perform a function of calculating a virtual assist torque value.

Since the virtual assist torque is calculated using the signal value of the steering torque sensor and the signal value of the vehicle speed sensor, similar to a conventional EPS system, the virtual assist torque calculator 63 may calculate the virtual assist torque based on the assist map of the existing steering control system, rather than based on a separate assist map used in the Steer-By-Wire system.

In this case, since there is no mechanical connection between the steering wheel and the rack in the Steer-By-Wire system, the virtual assist torque value calculated by the virtual assist torque calculator 63 is not an actual assist torque value, but is a value determined on the assumption that there is a virtual mechanical connection between the steering wheel and the rack.

The reaction controller 55, based on the virtual manual torque value calculated by the virtual manual torque calculator 61 and the virtual assist torque value calculated by the virtual assist torque calculator 63, may perform a function of generating the steering reaction force.

As described above, since the driver's steering sensation stems from the difference between the manual torque and the assist torque, if the torque corresponding to the difference between the virtual manual torque value and the virtual assist torque value is applied to the motor coupled to the steering column, the driver may feel the steering reaction force at the magnitude of the applied torque in the opposite direction of the applied torque.

This is similar to the way in which the driver feels steering reaction force when there is a mechanical connection between the steering wheel and the rack, as in a conventional EPS system. Therefore, it is possible to utilize, for the Steer-By-Wire system, the tuning capability/know-how used in the conventional EPS system, which is simple compared to the steering reaction force generating device based on the rack force.

The virtual manual torque calculator 61, the virtual assist torque calculator 63, and the reaction controller 55, which are used in the Steer-By-Wire system according to the embodiment described above, may be implemented as partial modules of an integrated control device or an Electronic Control Unit (ECU), which is a control unit 50 provided in the vehicle.

The integrated control device or ECU of a vehicle may include a processor, a storage device, such as a memory, computer programs capable of performing specific functions, and the like. The virtual manual torque calculator 61, the virtual assist torque calculator 63, and the reaction controller 55 may be implemented as software modules capable of performing respective unique functions.

Figure 12:
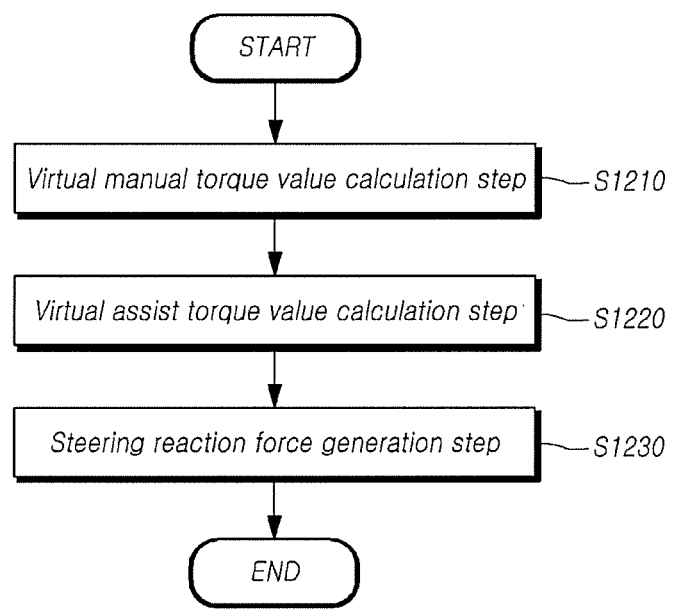
FIG. 12 is a flowchart illustrating a control process of a Steer-By-Wire system according to another embodiment of the present disclosure.

FIG. 12 is a flowchart illustrating a control process of a Steer-By-Wire system according to another embodiment of the present disclosure.

Hereinafter, a description will be made of an example in which the present method is executed by the state variable estimator illustrated in FIG. 11.

Referring to FIG. 12, the present method may include a virtual manual torque calculation step in which the virtual manual torque calculator 61 of the state variable estimator 60, based on a torque value of a Switched Reluctance Motor (SRM) coupled to the rack gear, calculates a virtual manual torque value (S1210).

As described above, the virtual manual torque value, based on the torque value of the SRM, may be calculated through a function using a gear ratio of the rack gear, a ball screw lead, and a predetermined virtual factor value.

In addition, the method may include a virtual assist torque calculation step, in which the virtual assist torque calculator 63 of the state variable estimator 60, based on a signal value received from the steering torque sensor and a signal value received from the vehicle speed sensor, calculates a virtual assist torque value (S1220).

As described above, since the signal value of the steering torque sensor and the signal value of the vehicle speed sensor are used similarly to the conventional EPS system, the virtual assist torque calculator 63 may calculate the virtual assistant torque based on the assist map of the existing steering control system, rather than based on a separate assist map used in the Steer-By-Wire system.

Further, the method may include a steering reaction force generation step in which the reaction controller 55 of the state variable estimator 60, based on the virtual manual torque value and the virtual assist torque value described above, generates steering reaction force (S1230).

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The methods according to the exemplary embodiments of the present disclosure may be in a form of program commands executed through various computer means to be recorded in a computer readable medium. The computer readable medium may include a program command, a data file, a data structure, and the like independently or in combination.

The program command recorded in the computer-readable medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. The computer-readable recording media may be transmission media such as light, a metal wire, or a waveguide including a carrier for carrying a signal designating program instructions, data structures, and the like. Examples of the program command include a machine language code generated by a compiler and a high-level language code executable by a computer through an interpreter and the like.

The aforementioned hardware device may be configured to operate as one or more software modules in order to perform the operation of the present disclosure, and vice versa.

The present disclosure has been described above in connection with the embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. A Steer-By-Wire system comprising:
   a sensor configured to sense state information on a vehicle, which is generated when a driver operates a steering wheel;
   a reaction motor configured to provide a reaction force in a direction opposite an operating direction of the steering wheel;
   a processor configured to receive the state information on the vehicle and configured to estimate a plurality of state variables from which disturbances have been removed; and
   a reaction controller configured to determine a reaction torque to be output from the reaction motor using the plurality of state variables estimated by the processor;
   wherein the sensor comprises a torque sensor configured to sense torsion bar torque generated when the driver operates the steering wheel and a steering angle sensor configured to sense a steering angle of the steering wheel, wherein the processor receives information on the torsion bar torque and the steering angle and estimates the plurality of state variables from which disturbances have been removed, and wherein, if respective differences between the plurality of state variables and the sensed information on the torsion bar torque, the steering angle, and a rotational angle of the reaction motor are equal to or more than a predetermined specific value, the processor recalculates estimated values of the plurality of state variables.

2. The Steer-By-Wire system of claim 1, further comprising a motor position sensor configured to sense a rotational angle of the reaction motor, wherein the processor receives information on the rotational angle of the reaction motor and calculates gain interpolation parameters of the processor.

3. The Steer-By-Wire system of claim 2, wherein the state processor has information on reference estimator gains, defined using a Kalman filter, for 4 vertices and calculates an interpolated estimator gain by applying the calculated gain interpolation parameters to the reference estimator gains.

4. The Steer-By-Wire system of claim 3, wherein the processor receives information on the steering angle of the steering wheel and the torsion bar torque and calculates estimated values of the plurality of state variables from which disturbances have been removed by applying the interpolated estimator gain.

5. The Steer-By-Wire system of claim 1, further comprising:
a steering motor configured to steer the wheels; and
a steering controller configured to receive the estimated values of the plurality of state variables from the processor and configured to control steering torque output from the steering motor.

6. The Steer-By-Wire system of claim 5, further comprising a current sensor configured to sense a phase current of one of either the reaction motor or the steering motor, wherein the processor determines whether or not an error occurs in the current sensor by comparing a phase current sensed by the current sensor with a phase current calculated by the processor.

7. The Steer-By-Wire system of claim 1, wherein the estimated values of the plurality of state variables, which are calculated by the processor, comprise at least one of driver torque, a steering angle of the steering wheel, an angular velocity of steering of the steering wheel, torsion bar torque, a difference in angular velocity between the steering wheel and the motor, and a phase current.

8. The Steer-By-Wire system of claim 1, further comprising a current sensor configured to sense a phase current of one of either the reaction motor or a steering motor, wherein the processor determines whether or not an error occurs in the current sensor by comparing a phase current sensed by the current sensor with a phase current calculated by the processor.

9. The Steer-By-Wire system of claim 1, wherein the sensor comprises a steering angle sensor configured to sense a steering angle of the steering wheel when the driver operates the steering wheel and a current sensor configured to sense a phase current output from the reaction motor, and wherein the processor receives information on the steering angle and the phase current and estimates the plurality of state variables from which disturbances have been removed.

10. The Steer-By-Wire system of claim 9, wherein the state processor has information on reference estimator gains defined using a Kalman filter and estimates the plurality of state variables by applying the reference estimator gains to a differential phase equation.

11. The Steer-By-Wire system of claim 10, further comprising a motor position sensor configured to sense a rotational angle of the reaction motor, wherein the processor applies information on the rotational angle of the reaction motor to the differential phase equation when estimating the plurality of state variables.

12. The Steer-By-Wire system of claim 9, further comprising a torque sensor configured to sense torsion bar torque generated when the steering wheel is operated, wherein the processor determines whether or not an error occurs in the torque sensor by comparing torsion bar torque sensed by the torque sensor with torsion bar torque calculated by the processor.

13. The Steer-By-Wire system of claim 1, wherein the processor is further configured to calculate a virtual manual torque value based on a torque value of a Switched Reluctance Motor (SRM) coupled to a rack gear and to calculate a virtual assist torque value based on a signal value received from a steering torque sensor and a signal value received from a vehicle speed sensor, and wherein the reaction controller determines the reaction torque based on the virtual manual torque value and the virtual assist torque value.

14. The Steer-By-Wire system of claim 1, wherein, when the respective differences are less than the predetermined specific value, the reaction controller determines the reaction torque to be output from the reaction motor based on the estimated values of the plurality of state variables.

15. A control method of a Steer-By-Wire system, the method comprising:
sensing state information on a vehicle, which is generated when a driver operates a steering wheel;
receiving the state information on the vehicle and estimating a plurality of state variables from which disturbances have been removed; and
determining a reaction torque to be output from a reaction motor configured to provide a reaction force in a direction opposite an operating direction of the steering wheel using the plurality of state variables, wherein the state information comprises torsion bar torque generated when the driver operates the steering wheel, a steering angle of the steering wheel, and a rotational angle of the reaction motor, and wherein, if respective differences between the plurality of state variables and the sensed information on the torsion bar torque, the steering angle, and the rotational angle of the reaction motor are equal to or more than a predetermined specific value, estimated values of the plurality of state variables are recalculated.

* * * * *